United States Patent [19]
Hwang

[11] Patent Number: 5,894,243
[45] Date of Patent: Apr. 13, 1999

[54] THREE-PIN BUCK AND FOUR-PIN BOOST CONVERTER HAVING OPEN LOOP OUTPUT VOLTAGE CONTROL

[75] Inventor: Jeffrey H. Hwang, Saratoga, Calif.

[73] Assignee: Micro Linear Corporation, San Jose, Calif.

[21] Appl. No.: 08/763,401

[22] Filed: Dec. 11, 1996

[51] Int. Cl.$^6$ .................................................. G05F 1/10
[52] U.S. Cl. ...................... 327/540; 323/242; 323/266; 323/282; 323/299
[58] Field of Search ......................... 323/301, 266, 323/282, 299, 242, 222; 327/176, 177, 332, 540, 175

[56] References Cited

U.S. PATENT DOCUMENTS

| | | | |
|---|---|---|---|
| 3,294,981 | 12/1966 | Bose | 307/88.5 |
| 3,603,809 | 9/1971 | Uchiyama | 307/228 |
| 3,660,753 | 5/1972 | Judd et al. | 323/22 T |
| 3,883,756 | 5/1975 | Dragon | 307/265 |
| 4,311,954 | 1/1982 | Capel | 323/222 |
| 4,392,103 | 7/1983 | O'Sullivan et al. | 323/222 |
| 4,407,588 | 10/1983 | Arichi et al. | 368/118 |
| 4,422,138 | 12/1983 | Kornrumpf | 363/21 |
| 4,437,146 | 3/1984 | Carpenter | 363/21 |
| 4,454,558 | 6/1984 | Huddart | 361/153 |
| 4,456,872 | 6/1984 | Froeschle | 323/286 |
| 4,529,927 | 7/1985 | O'Sullivan et al. | 323/222 |
| 4,651,231 | 3/1987 | Douglas, Jr. | 358/342 |
| 4,672,303 | 6/1987 | Newton | 323/285 |
| 4,672,518 | 6/1987 | Murdock | 363/21 |
| 4,674,020 | 6/1987 | Hill | 363/21 |
| 4,677,366 | 6/1987 | Wilkinson et al. | 323/222 |
| 4,691,159 | 9/1987 | Ahrens et al. | 323/222 |
| 4,731,574 | 3/1988 | Melbert | 323/275 |
| 4,736,151 | 4/1988 | Dishner | 323/224 |
| 4,761,725 | 8/1988 | Henze | 363/46 |
| 4,801,859 | 1/1989 | Dishner | 323/222 |
| 4,837,495 | 6/1989 | Zansky | 323/222 |
| 4,841,220 | 6/1989 | Tabisz et al. | 323/282 |
| 4,845,420 | 7/1989 | Oshizawa et al. | 323/222 |
| 4,920,309 | 4/1990 | Szepesi | 323/269 |
| 4,929,882 | 5/1990 | Szepesi | 323/222 |

(List continued on next page.)

FOREIGN PATENT DOCUMENTS 60-22490   2/1985   Japan.

OTHER PUBLICATIONS

"Nonlinear–Carrier Control for High Power Factor Rectifiers Based On Flyback, Cuk, or Sepic Converters," R. Zane and D. Maksimovic, Applied Power Electronics Conf., pp. 814–820, 1996.

"Nonlinear–Carrier Control for High Power Factor Boost Rectifiers," D. Maksimovic, Y. Jang, R. Erikson, Applied Power Electronics Conf., pp. 635–641, 1995.

(List continued on next page.)

*Primary Examiner*—Timothy P. Callahan
*Assistant Examiner*—Jung Ho Kim
*Attorney, Agent, or Firm*—Haverstock & Owens LLP

[57] ABSTRACT

A controlled output voltage is provided for a switching mode power converter operating in the continuous conduction mode without requiring a feedback path coupled to monitor the output voltage. Instead, a voltage related to the input voltage is monitored. The monitored voltage is compared to a periodic waveform for forming a switch control signal. In the case of a buck converter operating as a voltage regulator, over each period of the periodic waveform, the periodic waveform is representative of the inverse function. In the case of a boost converter operating as a voltage regulator or buck converter operating as a bus terminator or power amplifier, over each period of the periodic waveform, the periodic waveform has a linear slope. The switch control signal controls a duty cycle of the power switches. Therefore, switching is controlled in an open loop, rather than in a closed loop. By monitoring a voltage related to the input voltage, rather than the output voltage, an integrated circuit for controlling the buck converter or boost converter requires few pins and can sink or source current.

41 Claims, 15 Drawing Sheets

U.S. PATENT DOCUMENTS

| | | | |
|---|---|---|---|
| 4,940,929 | 7/1990 | Williams | 323/222 |
| 4,941,080 | 7/1990 | Sieborger | 363/127 |
| 4,947,309 | 8/1990 | Jonsson | 363/17 |
| 4,975,823 | 12/1990 | Rilly et al. | 363/56 |
| 5,028,861 | 7/1991 | Pace et al. | 323/222 |
| 5,034,873 | 7/1991 | Feldtkeller | 363/21 |
| 5,138,249 | 8/1992 | Capel | 323/283 |
| 5,146,399 | 9/1992 | Gucyski | 363/89 |
| 5,278,490 | 1/1994 | Smedley | 323/284 |
| 5,359,281 | 10/1994 | Barrow et al. | 323/284 |
| 5,397,976 | 3/1995 | Madden et al. | 323/222 |
| 5,412,308 | 5/1995 | Brown | 323/267 |
| 5,414,341 | 5/1995 | Brown | 323/268 |
| 5,434,767 | 7/1995 | Batarseh et al. | 363/16 |
| 5,440,473 | 8/1995 | Ishii et al. | 363/21 |
| 5,450,000 | 9/1995 | Olsen | 323/222 |
| 5,457,621 | 10/1995 | Munday et al. | 363/56 |
| 5,457,622 | 10/1995 | Arakawa | 363/59 |
| 5,461,302 | 10/1995 | Garcia et al. | 323/222 |
| 5,477,132 | 12/1995 | Canter et al. | 323/282 |
| 5,479,089 | 12/1995 | Lee | 323/283 |
| 5,481,178 | 1/1996 | Wilcox et al. | 323/287 |
| 5,485,361 | 1/1996 | Sokal | 363/21 |
| 5,491,445 | 2/1996 | Moller et al. | 327/540 |
| 5,502,370 | 3/1996 | Hall et al. | 323/284 |
| 5,532,577 | 7/1996 | Doluca | 323/282 |
| 5,552,695 | 9/1996 | Schwartz | 323/271 |
| 5,565,761 | 10/1996 | Hwang | 323/222 |
| 5,568,041 | 10/1996 | Hesterman | 323/207 |
| 5,570,276 | 10/1996 | Cuk et al. | 363/16 |
| 5,592,071 | 1/1997 | Brown | 323/282 |
| 5,592,128 | 1/1997 | Hwang | 331/61 |
| 5,610,502 | 3/1997 | Tallant, II et al. | 323/222 |
| 5,617,306 | 4/1997 | Lai et al. | 363/17 |
| 5,627,460 | 5/1997 | Bazinet et al. | 323/288 |
| 5,691,889 | 11/1997 | Bazinet et al. | 363/89 |

OTHER PUBLICATIONS

"Off–Line And One–Cell IC Converters Up Efficiency", Frank Goodenough, Electronic Design, pp. 55–56, 58, 60, 62–64, Jun. 27, 1994.

"Designing with hysteretic current–mode control", Gedaly Levin and Kieran O'Malley, Cherry Semi–Conductor Corp., EDN, pp. 95–96, 98, 100–102, Apr. 28, 1994.

"Step–Up/Step Down Converters Power Small Portable Systems", Bruce D. Moore, EDN, pp. 79–84, Feb. 3, 1994.

"Small–Signal High–Frequency Analysis Of The Free–Running Current–Mode–Controlled Converter", Richard Redl, pp. 897–906, IEEE, 1991.

5,894,243

THREE-PIN BUCK AND FOUR-PIN BOOST CONVERTER HAVING OPEN LOOP OUTPUT VOLTAGE CONTROL

FIELD OF THE INVENTION

The invention relates to buck and boost voltage converters. More particularly, the invention relates to buck and boost voltage converters which provide a regulated output voltage without a feedback loop for monitoring the output voltage.

BACKGROUND OF THE INVENTION

In a typical voltage converter, the output voltage is regulated by monitoring a level of the output voltage, comparing that monitored level to a predetermined desired level and developing a response to that comparison to minimize the difference between the monitored level and the predetermined desired level of the output voltage. FIG. 1 illustrates a typical buck converter circuit for providing a regulated output voltage. Referring to FIG. 1, a supply voltage node Vs is coupled to a first terminal of a switch S1. A second terminal of the switch S1 is coupled to a first terminal of a switch S2 and to a first terminal of an inductor L1. A second terminal of the inductor L1 is coupled to a first terminal of a capacitor C1, forming an output node Vo, and to a first terminal of a resistor R1. A second terminal of the switch S2 and a second terminal of the capacitor C1 are coupled to a ground node. A load RL can be coupled across the capacitor C1.

A second terminal of the resistor R1 is coupled to a first terminal of a resistor R2 and to an inverting input of an amplifier U1. A second terminal of the resistor R2 is coupled to the ground node. A reference voltage VREF1 is coupled to a non-inverting input of the amplifier U1. An output of the amplifier U1 forms an error signal VEAO1 which is coupled to a non-inverting input of a comparator U2. An oscillator U3 generates a periodic ramp signal VRAMP1 having a fixed frequency which is coupled to an inverting input of the comparator U2. An output of the comparator U2 forms a signal VSC1 which is coupled to control the switch S1. The signal VSC1 is inverted by an inverter U4 for controlling the switch S2.

FIG. 2 illustrates a timing diagram for the signal VRAMP1 and the signal VEAO1. FIG. 3 illustrates a timing diagram for the signal VSC1. Referring to FIGS. 1–3, when the signal VSC1 is logical high voltage, the switch S1 is closed and the switch S2 is open. When the switches S1 and S2 are in this condition, a current from the supply node Vs charges the inductor L1 with energy. When the signal VSC1 is a logical low voltage, the switch S1 is open and the switch S2 is closed. Therefore, energy stored in the inductor L1 is transferred to the capacitor C1. By alternately closing and opening the switches S1 and S2 in this manner, an output voltage can be formed across the capacitor C1 which can be applied to the load RL. The amount of energy stored in the inductor L1 and transferred to the capacitor C1 can be controlled by adjusting the time period during which the switch S1 is closed.

A resistive divider comprising the resistors R1 and R2 forms a voltage that is proportional to the output voltage across the capacitor C1. A difference between the reference voltage VREF1 and the voltage formed by the resistive divider is amplified by the amplifier U1, forming the error signal VEAO1. The error signal VEAO1 is compared to the ramp signal VRAMP1 by the comparator U2, forming the signal VSC1. Accordingly, if the voltage across the capacitor C1 increases, the signal VEAO1 decreases. This reduces the duty cycle of the signal S1 such that the amount of energy transferred to the capacitor C1 is reduced, thereby reducing the voltage across the capacitor C1. If the voltage across the capacitor C1 decreases, the signal VEAO1 increases. This increases the duty cycle of the signal S1 such that the amount of energy transferred to the capacitor C1 is increased, thereby increasing the voltage across the capacitor C1. Therefore, the output voltage at the node Vo is regulated in a feedback loop to remain at a constant level. Because the circuit illustrated in FIG. 1 utilizes the topology of a buck converter, the output voltage Vo cannot be higher than the input voltage Vs.

Because the duty cycle of the signal VSC1 is controlled by monitoring the output voltage, a feedback path, such as through the resistive divider, is required to be coupled to the output node Vo. When such a circuit is implemented in an integrated circuit, this feedback path requires a dedicated pin of the integrated circuit package. The size and cost of an integrated circuit, however, increases as the number of pins increases. Further, the inductor L1 and capacitor C1 in the feedback loop can contribute to instability of the feedback loop. Additional components can be required to counteract this effect. It is therefore desired to provide a regulated output voltage without requiring a feedback path coupled to the output node Vo.

A boost converter having a prior art feedback loop for monitoring the output voltage is illustrated in FIG. 4. A supply node Vs2 is coupled to a first terminal of an inductor L2. A second terminal of the inductor L2 is coupled to a first terminal of a switch S3 and to a first terminal of a switch S4. A second terminal of the switch S3 is coupled to the ground node. A second terminal of the switch S4 is coupled to a first terminal of a capacitor C2 and to a first terminal of a resistive divider comprising resistors R3 and R4. A second terminal of the capacitor C2 and a second terminal of the resistive divider are coupled to the ground node.

An output voltage Vo2 is formed across the capacitor C2 by appropriately opening and closing the switches S3 and S4. When the switch S3 is closed and the switch S4 is open, the input voltage Vs2 charges the inductor L2 with a current. When the switch S3 is open and the switch S4 is closed, the inductor L2 discharges energy into the capacitor C2. A load RL2 is coupled across the capacitor C2 to receive the output voltage Vo2.

A voltage formed by the resistive divider is utilized as an input to a control circuit for controlling the duty cycle of the switches S3 and S4 to regulate the output voltage Vo2. An amplifier U5 forms an error signal VEAO2 that is representative of a difference between the output voltage Vo2 and a desired output voltage, represented by VREF2. A comparator U6 compares the error signal VEAO2 to a periodic ramp signal VRAMP2. An output of the comparator U6 forms a signal VSC2 which is coupled to control the switch S3. The signal VSC2 is inverted by an inverter U8 for controlling the switch S4.

If the error signal VEAO2 increases, the period of time during which the switch S3 is closed and the switch S4 is open is increased to charge the inductor L2 with more energy which is then discharged into the capacitor C2 when the switch S3 is opened and the switch S4 is closed. If the error signal VEAO2 decreases, the period of time during which the switch S3 is closed and the switch S4 is open is decreased. Therefore, the output voltage is regulated in a feedback loop. Because the circuit illustrated in FIG. 4 utilizes the topology of a boost converter, the output voltage Vo2 can be higher than the input voltage Vs2.

3

Because the duty cycle of the switches in the buck converter illustrated in FIG. 1 and in the boost converter illustrated in FIG. 4 are controlled by monitoring the output voltage Vo, a feedback path, such as through the resistive divider, is required to be coupled to the output node. When a circuit for controlling such a buck or boost voltage converter is implemented in an integrated circuit package, this feedback path requires a dedicated pin of the integrated circuit package. The size and cost of an integrated circuit, however, increases as the number of pins increases. It is desired, therefore, for a circuit for controlling a buck or boost converter to provide a regulated output voltage without the need for a feedback path for monitoring the output voltage.

SUMMARY OF THE INVENTION

The invention provides a controlled output voltage for a switching mode power converter operating in the continuous conduction mode without requiring a feedback path coupled to monitor the output voltage.

A buck converter includes a first switch having a first terminal coupled to a supply voltage node. A second terminal of the first switch is coupled to a first terminal of a second switch, to a first terminal of a first energy storage device and to a first terminal of a resistive divider. A second terminal of the first energy storage device is coupled to an output node. A first terminal of a second energy storage device is coupled to the output node and a second terminal of the second energy storage device is coupled to the ground node. When a switch control signal causes the first switch to be closed and the second switch to be open, a current from the supply node charges the energy storage device with energy. The amount of energy stored can be controlled by adjusting the time period during which the first switch is closed. When the first switch is open and the second switch is closed, the energy is transferred to the second energy storage device, providing an output voltage across the second energy storage device.

When the buck converter operates as a voltage regulator, the first energy storage device is an inductor and the second energy storage device is a capacitor. A voltage formed by the resistive divider is compared by a comparator to a periodic waveform. Over each period of the periodic waveform, the periodic waveform is representative of the inverse function. An output of the comparator controls a duty cycle of the first and second switches for maintaining a constant output voltage despite changes in the supply voltage. Because the buck converter can sink or source current, the voltage regulator can function as a bus terminator.

In addition, because the buck converter can sink or source current, the buck converter can operate as a power amplifier. When the buck converter operates as a power amplifier, the first energy storage device is a capacitor and the second energy storage device is an inductive load. A voltage formed by the resistive divider is added to a variable input signal for the power amplifier and compared by a comparator to a periodic waveform. Over each period of the periodic waveform, the periodic waveform has a linear slope. An output of the comparator controls a duty cycle of the first and second switches for providing an output voltage to the load that is representative of the variable input signal.

A boost converter includes an inductor having a first terminal coupled to a supply voltage node and a second terminal coupled to a first terminal of a first switch and to a first terminal of a second switch. A second terminal of the first switch is coupled to the ground node and a second

4 terminal of the second switch is coupled to an output node. A first terminal of a capacitor is coupled to the output node and a second terminal of the capacitor is coupled to the ground node. When a switch control signal causes the first switch to be closed and the second switch to be open, a current from the supply node charges the inductor with energy. The amount of energy stored can be controlled by adjusting the time period during which the first switch is closed. When the first switch is open and the second switch is closed, the energy is transferred to the capacitor, providing an output voltage across the second energy storage device.

A voltage formed by the resistive divider is compared by a comparator to a periodic waveform. Over each period of the periodic waveform, the periodic waveform has a linear slope. An output of the comparator controls a duty cycle of the first and second switches for providing a regulated output voltage.

In both the buck converter and in the boost converter, a voltage related to the input voltage is monitored for controlling switching, rather than monitoring the output voltage as in a conventional power converter. Therefore, switching is controlled in an open loop, rather than in a closed loop. By monitoring a voltage related to the input voltage, rather than the output voltage, an integrated circuit for controlling the buck converter or boost converter requires few pins. Also, the power converter can sink or source current. Therefore, the power converter can operate as a voltage regulator, a bus terminator or as a power amplifier. In the case of the power amplifier, the output voltage responds quickly to changes in input because the open loop is not slowed by a feedback response time.

DETAILED DESCRIPTION OF THE PREFERRED EMBODIMENT

Figure 1:
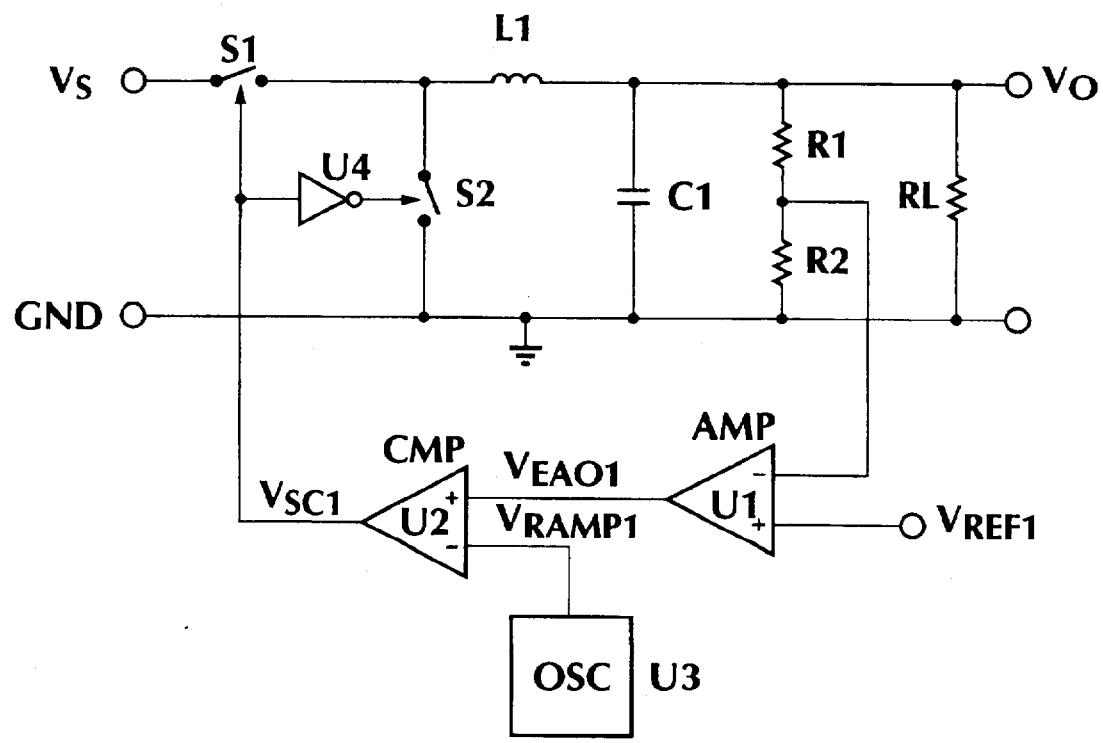
FIG. 1 illustrates a buck converter having a prior art feedback loop for monitoring the output voltage.
Figure 2:
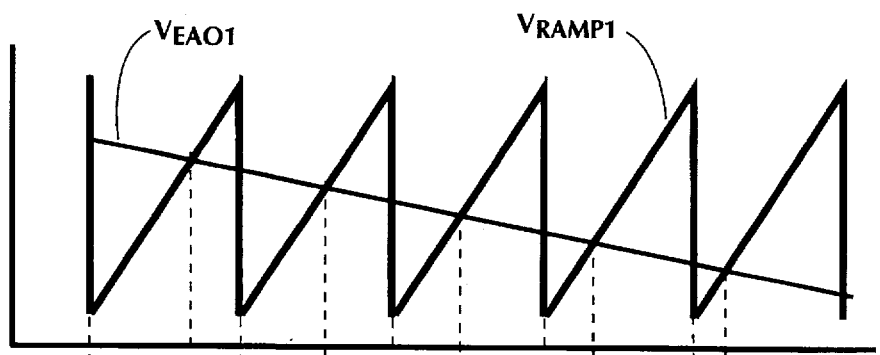
FIG. 2 illustrates a timing diagram of the error signal VEAO1 and ramp signal VRAMP1 for the buck converter illustrated in FIG. 1.
Figure 3:
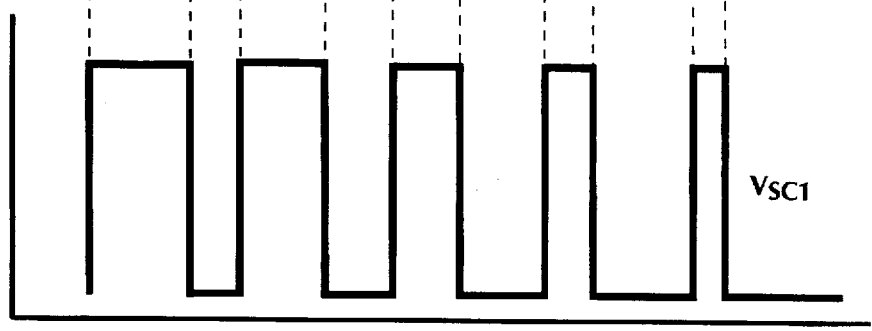
FIG. 3 illustrates a timing diagram of the signal VSC1 for the buck converter illustrated in FIG. 1.
Figure 4:
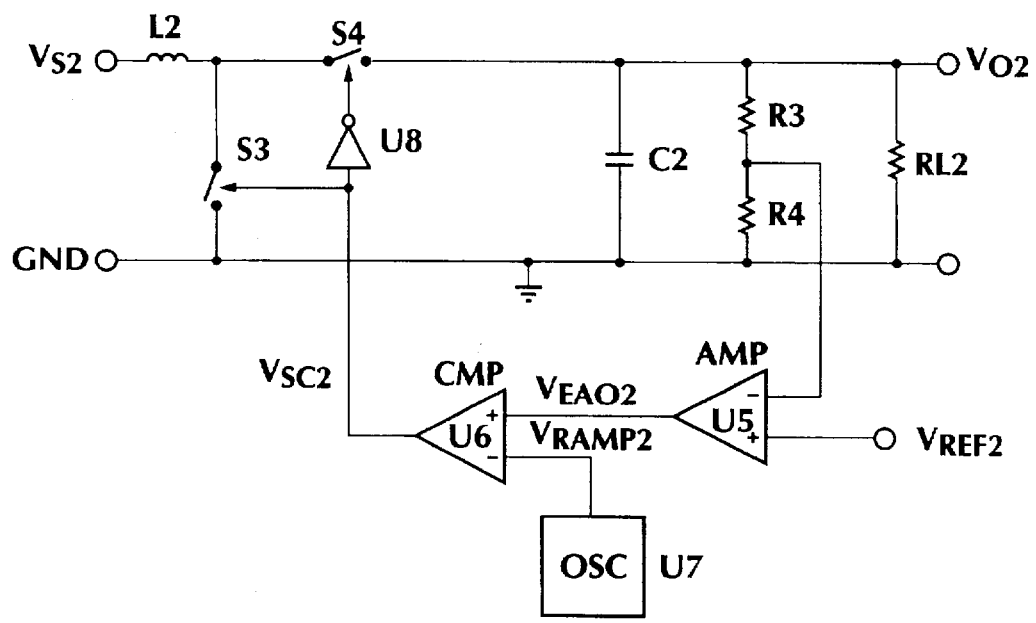
FIG. 4 illustrates a boost converter having a prior art feedback loop for monitoring the output voltage.
Figure 5:
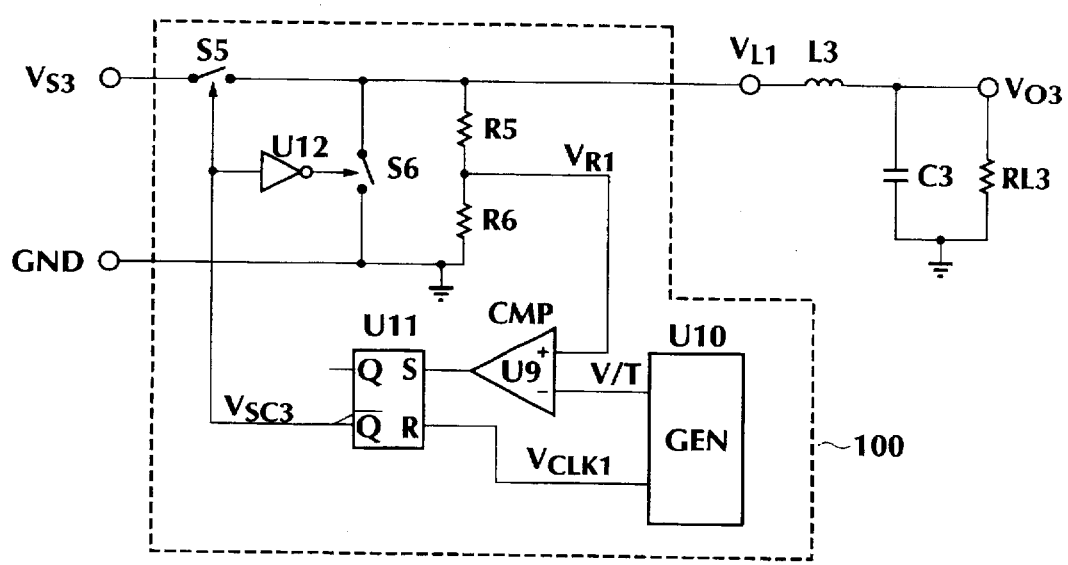
FIG. 5 illustrates a buck converter having its output voltage regulated according to the present invention.

FIG. 5 illustrates a buck converter having its output voltage regulated according to the present invention. A supply node Vs3 is coupled to a first terminal of a switch S5. A second terminal of the switch S5 is coupled to a first terminal of a switch S6, to a first terminal of a resistor R5 and to a first terminal of an inductor L3, forming a node VL1. A second terminal of the inductor L3 is coupled to a first terminal of a capacitor C3, forming an output node Vo3. A second terminal of the switch S6 and a second terminal of the capacitor C3 are coupled to a ground node. A load RL3 can be coupled across the capacitor C3.

A second terminal of the resistor R5 is coupled to a first terminal of a resistor R6 and to a non-inverting input of a comparator U9, forming a node VR1. A second terminal of the resistor R6 is coupled to the ground node. A signal generator U10 is coupled to provide a periodic ramp signal to an inverting input of the comparator U9. An output of the comparator U9 is coupled to a set input S of a flip-flop U11. A clock signal generated by the signal generator U10 is coupled to a reset input R of the flip-flop U11. A $\overline{Q}$ output of the flip-flop U11 forms a signal VSC3 and is coupled to control the switch S5. The signal VSC3 is inverted by an inverter U12 for controlling the switch S6.

Figure 6:
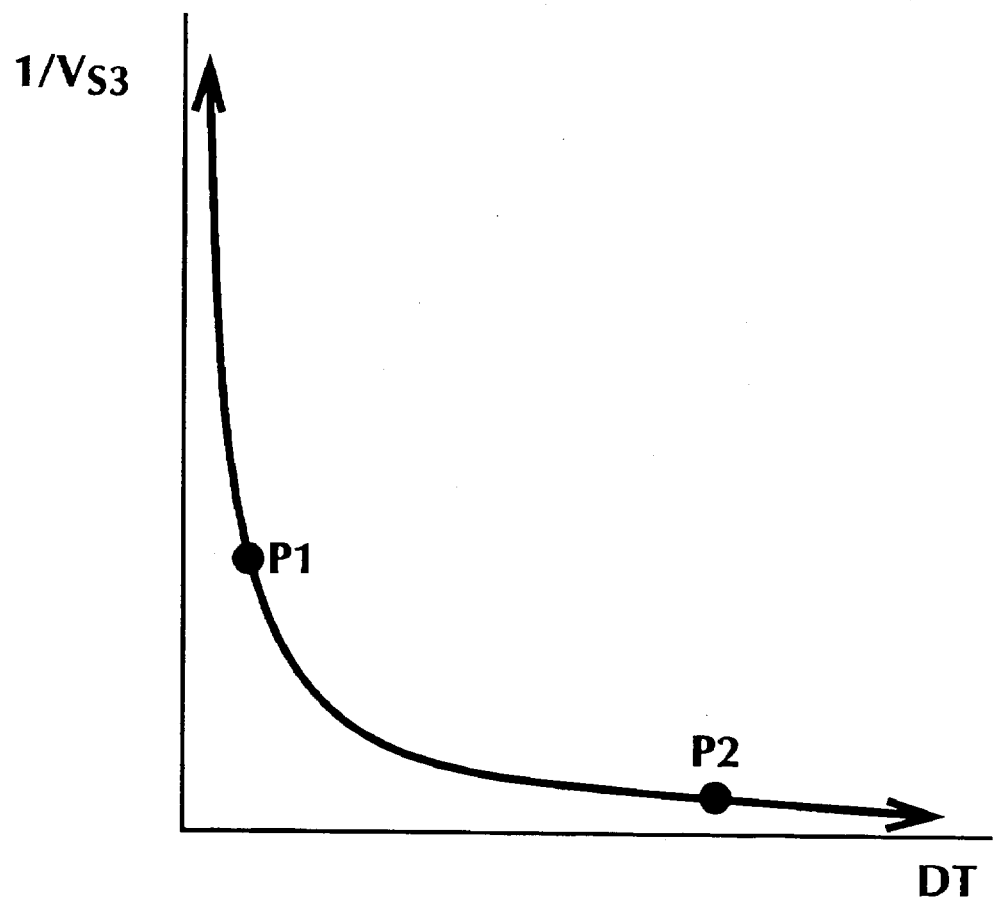
FIG. 6 illustrates a graph of 1/Vs vs. DT.

The buck converter illustrated in FIG. 5 always operates in continuous conduction mode. This means that a current in the inductor L3 flowing towards the output node Vo3 can be above zero or can fall below zero (e.g., this current is not clamped to zero by a diode in place of the switch S6). A duty cycle DT of the switch S5 is the portion of each switching cycle that the switch S5 is closed. Therefore, the output voltage Vo3 of the buck converter is equal to the duty cycle DT for the switch S5 multiplied by the input voltage: Vo3=(Vs3)(DT), assuming the switch S5 has zero on-resistance (i.e., the inductor L3 and capacitor C3 operate as a low pass filter). Therefore, the duty cycle DT is equal to the output voltage divided by the input voltage: Vo3/Vs3= DT. Assuming a constant output voltage is desired, the duty cycle DT is proportional to the inverse of the input voltage: 1/Vs3 DT. FIG. 6 illustrates a graph of 1/Vs3 vs. DT. The output voltage is the same for each point on the curve. For example, two points are illustrated: P1 and P2. P1 is located at 1/Vs3=2 and DT=1/2. Because Vo3=(Vs3)(DT), the output voltage Vo3 is therefore (2)(1/2)=1. P2 is located at 1/Vs3=1/4 and DT=4. The output voltage Vo3 is therefore (1/4)(4)=1.

By multiplying 1/Vs3 in the graph by a desired output voltage, then for each point on the curve, the output voltage will be equal to the desired output voltage. For example, assume the desired output voltage is 10 volts. Therefore, the 1/Vs3 axis will be expanded by a factor of ten. The point P1 will then be located at 1/Vs3=20 and DT=1/2. Because Vo3=(Vs3)(DT), the output voltage Vo is therefore (20)(1/2)=10 volts. The point P2 will then be located at 1/Vs3=5/2 and DT=4. The output voltage will then be (5/2)(4)=10 volts.

Therefore, by selecting an appropriate duty cycle for each switching cycle from points on the curve, the output voltage remains constant despite changes in the input voltage. Accordingly, the generator circuit U10 illustrated in FIG. 5 generates a periodic waveform V/T (FIG. 7) that has a similar shape over each period to the graph illustrated in FIG. 6. The periodic waveform V/T is related to 1/time vs. time. By comparing this periodic waveform V/T to a voltage level that is representative of the input voltage Vs3 for each switching cycle, an appropriate duty cycle DT can be determined for maintaining a constant output voltage Vo3 without the need for monitoring the output voltage Vo3 in a feedback loop. Because the output voltage Vo3 is not monitored, when the control circuit 100 is implemented as an integrated circuit, a pin is saved.

Further, because a voltage representative of the input voltage Vs3 is monitored rather than the output voltage Vo3 and because the current in the inductor L3 can flow towards the input node, the power converter according to the present invention can sink current in addition to sourcing current, while maintaining a regulated output voltage level. As will be explained in more detail below, this feature allows the power converter according to the present invention to function as a bus terminator or as a power amplifier.

Figure 7:
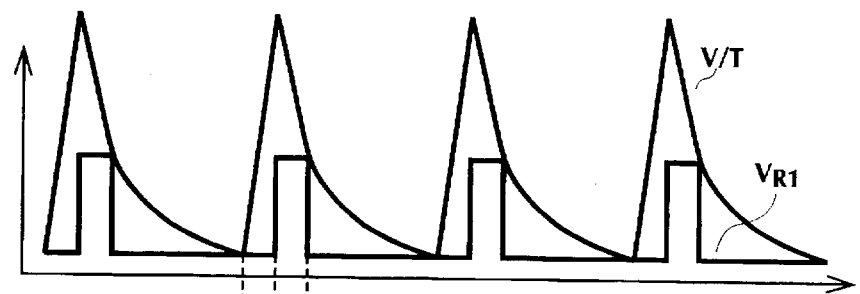
FIG. 7 illustrates a timing diagram of a signal V/T generated by the generator circuit illustrated in FIG. 5.
Figure 8:
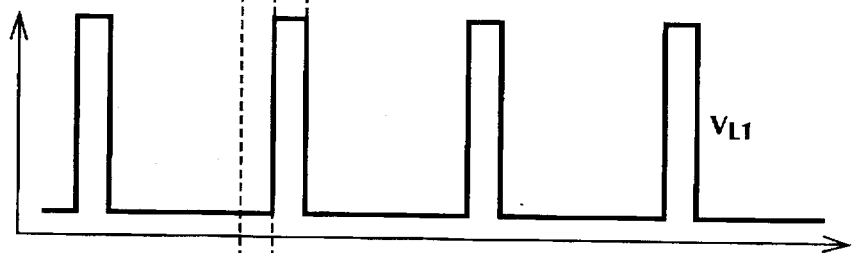
FIG. 8 illustrates a timing diagram of a signal VL1 at the first terminal of the inductor L1.
Figure 9:
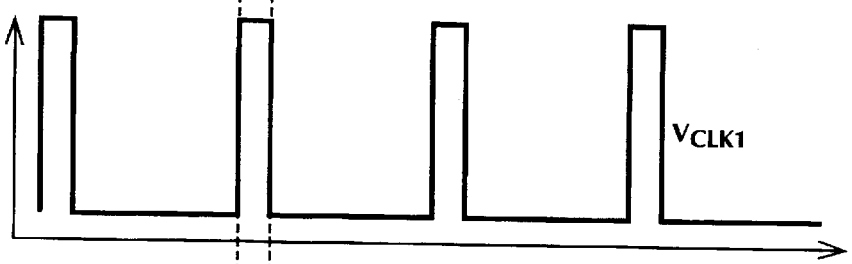
FIG. 9 illustrates a timing diagram of the clock signal VCLK1 generated by the generator circuit illustrated in FIG. 5.

FIG. 7 illustrates a timing diagram of a signal V/T generated by the generator circuit U10 illustrated in FIG. 5. The signal V/T is periodic and has an amplitude that is proportional 1/time over each period. As explained above, such a waveform is suitable for comparison with a signal representative of the input voltage Vs3 for controlling the duty cycle DT of the switch S5 for maintaining a constant output voltage Vo3. FIG. 7 also illustrates a timing diagram of the signal VR1 formed by the resistive divider illustrated in FIG. 5. The signal VR1 is representative of the input voltage Vs3 when the switch S5 is closed and the switch S6 is open. The signal VR1 will be reduced, however, by an amount determined by the values of the resistors R5 and R6 and by the on-resistance of the switch S5. FIG. 8 illustrates a timing diagram of a signal VL1 at the first terminal of the inductor L3. FIG. 9 illustrates a timing diagram of the clock signal VCLK1 generated by the generator circuit U10 illustrated in FIG. 5.

Referring to FIGS. 5, and 7–9, when the $\overline{Q}$ output of the flip-flop U11 is at a logical high voltage, the switch S5 is closed and switch S6 is open. Because the switch S5 is closed, the signal VR1 is above zero volts. The signal V/T begins falling, but while it is higher than the signal VR1, the output of the comparator U9 is a logical low voltage, maintaining the $\overline{Q}$ output at a logical high voltage. When the signal V/T falls below the level of the signal VR, the output of the comparator U9 becomes a logical high voltage. This sets the $\overline{Q}$ output of the flip-flop U11 to a logical low voltage, opening the switch S5 and closing the switch S6. The $\overline{Q}$ output of the flip-flop U11 remains at a logical low voltage until the clock signal VCLK1 resets the $\overline{Q}$ output to a logical high voltage, and the cycle repeats. The shape of the waveform V/T is appropriate for determining an appropriate switching time despite variations in the level of the signal VR1. Therefore, the output voltage is regulated without a feedback path coupled to the output node Vo3.

The level of the regulated output voltage Vo3 can be adjusted by adjusting the level of the signal VR1. This can be accomplished by selecting appropriate values for the resistors R5 and R6. Alternately, the level of the output voltage Vo3 can be selected by adjusting a level of the signal V/T, as explained below.

Figure 11:
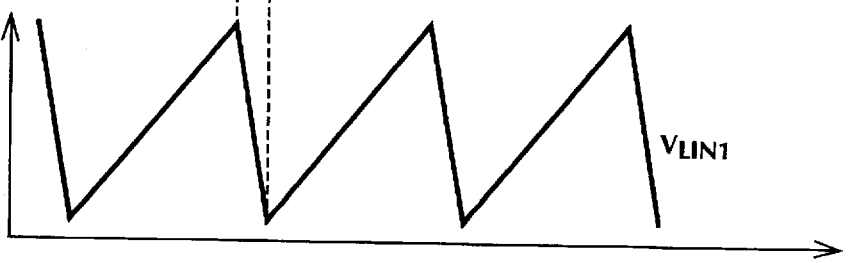
FIG. 11 illustrates a timing diagram for the signal VLIN1 generated by the circuit illustrated in FIG. 10.
Figure 10:
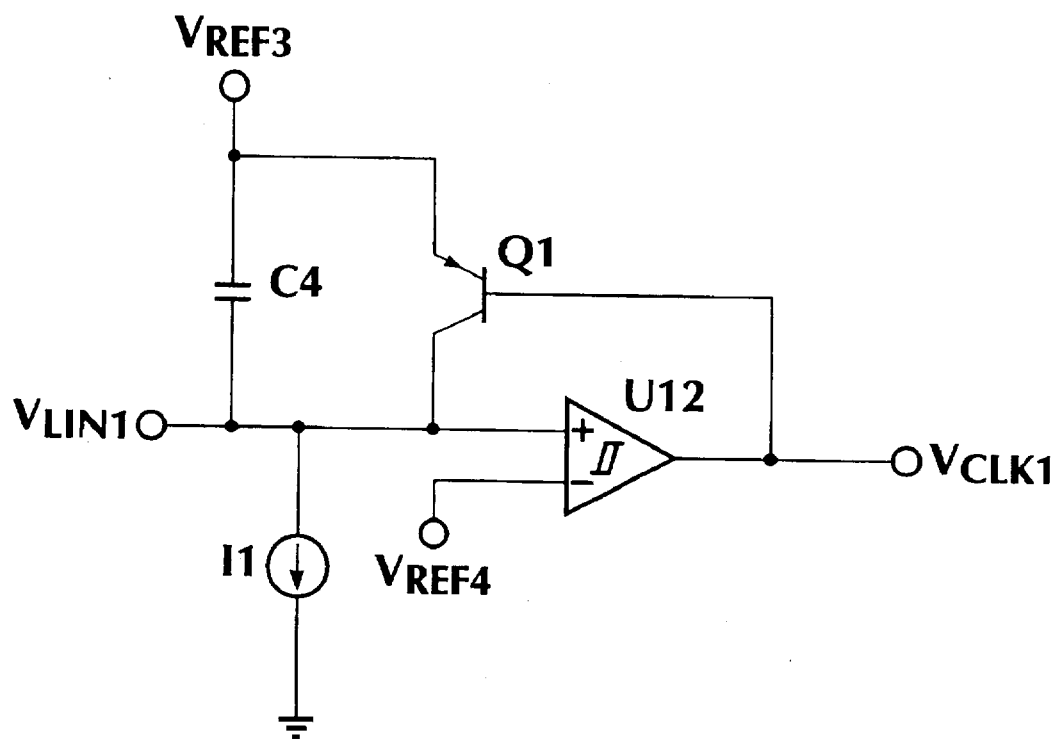
FIG. 10 illustrates a schematic diagram of a generator circuit for generating a periodic ramp signal VLIN1 having a negative linear slope and for generating the clock signal VCLK1.

FIG. 10 illustrates a schematic diagram of a generator circuit for generating a periodic ramp signal VLIN1 (FIG. 11) having a negative linear slope and for generating the clock signal VCLK1 (FIG. 9). A reference voltage VREF3 is coupled to a first terminal of a capacitor C4 and to an emitter of an pnp bipolar transistor Q1. A second terminal of the capacitor C4 is coupled to a collector of the transistor Q1, to a first terminal of a current source I1 and to a non-inverting input of a hysteretic comparator U12, forming a node VLIN1. A second terminal of the current source I1 is coupled to the ground node. An output of the comparator U12 is coupled to a base of the transistor Q1, forming a node VCLK1. An inverting input of the comparator U12 is coupled to a reference voltage VREF4. FIG. 11 illustrates a timing diagram for the signal VLIN1 generated by the circuit illustrated in FIG. 10 and is shown in relation to the timing diagrams of the waveforms of FIGS. 7–9.

Referring to FIGS. 10–11, the reference voltage VREF4 is lower than the reference voltage VREF3. When the output of the comparator U12 is a logical low voltage, the transistor Q1 is turned on, bringing the voltage level at the node VLIN1 to near the voltage level of VREF3. This causes the output of the comparator U12 to rise to a logical high voltage. Because the comparator U12 is hysteretic, its output does not rise until the charge on the capacitor C4 has substantially equalized. Then, the current source I1 begins drawing current from the capacitor C4, causing the voltage at the node VLIN1 to fall such that it has a negative slope that is substantially linear. When the voltage at the node VLIN1 falls below the reference voltage VREF4, the output of the comparator U12 falls to a logical low voltage, turning the transistor Q1 on again, and the cycle repeats.

Figure 12:
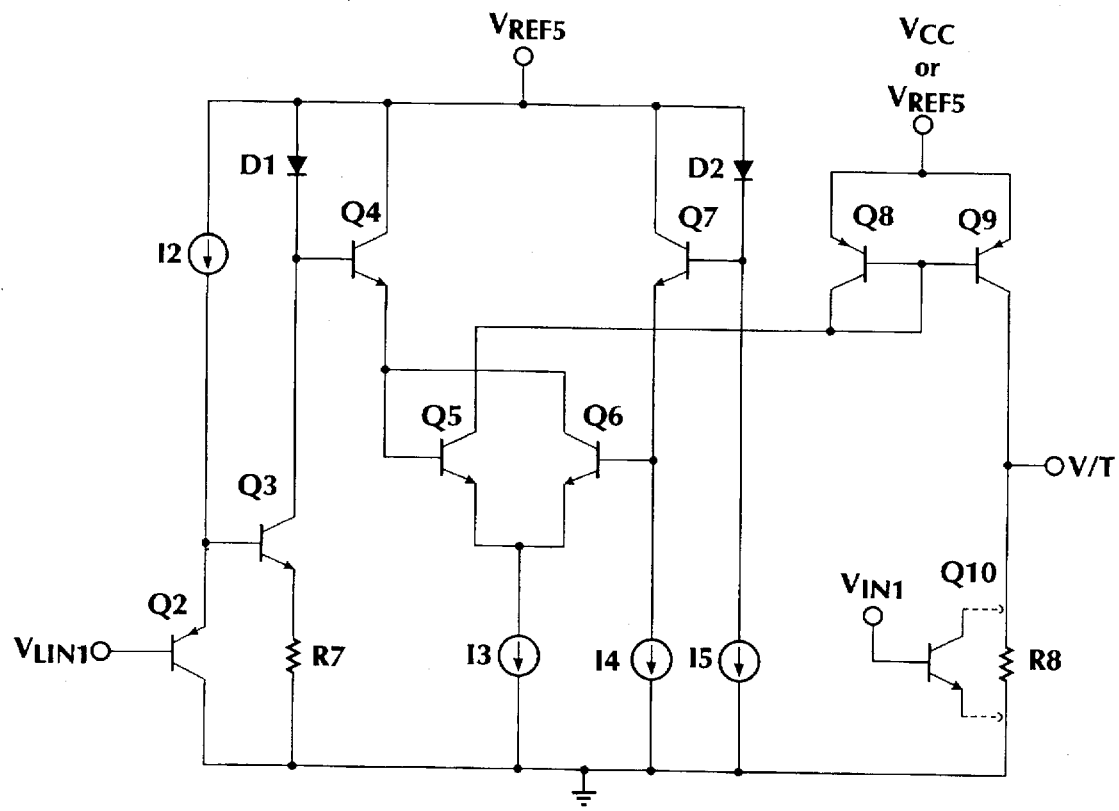
FIG. 12 illustrates a schematic diagram of a circuit for forming the periodic ramp signal V/T.

FIG. 12 illustrates a schematic diagram of a circuit for forming the periodic ramp signal V/T. The periodic signal VLIN1 is applied to a base of an pnp bipolar transistor Q2. An emitter of the transistor Q2 is coupled to a first terminal of a current source I2 and to a base of an npn bipolar transistor Q3. An emitter of the transistor Q3 is coupled to a first terminal of a resistor R7. A collector of the transistor Q2 and a second terminal of the resistor R7 are coupled to the ground node. A collector of the transistor Q3 is coupled to a base of an npn bipolar transistor Q4 and to a cathode of a diode D1. A second terminal of the current source I2, an anode of he diode D1 and a collector of the transistor Q4 are coupled to a reference voltage node VREF5.

An emitter of the transistor Q4 is coupled to a base of a npn bipolar transistor Q5 and to a collector of an npn bipolar transistor Q6. An emitter of the transistor Q5 is coupled to an emitter of the transistor Q6 and to a first terminal of a current source I3. A base of the transistor Q6 is coupled to a first terminal of a current source I4 and to an emitter of an npn bipolar transistor Q7. A base of the transistor Q7 is coupled to a cathode of a diode D2 and to a first terminal of a current source I5. A collector of the transistor Q7 and an anode of the diode D2 are coupled to the reference voltage node VREF5. A second terminal of the current source I3, a second terminal of the current source I4 and a second terminal of the current source I5 are coupled to the ground node.

A collector of the transistor Q5 is coupled to an emitter of a collector of a pnp bipolar transistor Q8, to a base of the transistor Q8 and to a base of a pnp bipolar transistor Q9. An emitter of the transistor Q8 and an emitter of the transistor Q9 are coupled to the reference voltage node VREF5 or to another voltage source such as VCC. A collector of the transistor Q9 is coupled to a first terminal of a resistor R8, forming an output node V/T. A second terminal of the resistor R8 is coupled to the ground node. The signal V/T illustrated in FIG. 7 is generated at the node V/T of the circuit illustrated in FIG. 12.

Referring to FIG. 12, the voltage level of the periodic signal V/T can be varied to correspondingly vary the output voltage Vo3 of the buck converter illustrated in FIG. 5. This can be accomplished by adjusting the resistance of the resistor R8. For adjusting the output voltage Vo3 in response to a varying input signal VIN1, the resistor R8 can be replaced by a transistor Q10 wherein a base of the transistor Q10 is coupled to receive the varying signal VIN1. Therefore, the base of the transistor Q10 becomes an input node for a power amplifier and the output node of the power amplifier is the output node Vo3 of the buck converter illustrated in FIG. 5. Because the signal V/T is related to the inverse function, however, the output of the power amplifier is not affected by changes in the input supply voltage Vs3.

Because the voltage VR1, which is representative of the voltage at the node VL1, rather than the output voltage at the node Vo3, is monitored for regulating the output voltage, when a circuit for controlling a buck converter according to the present invention is implemented in an integrated circuit package, a pin is not required for coupling circuits internal to the integrated circuit to monitor the output voltage. Therefore, as illustrated by the dotted line in FIG. 5, an integrated circuit 100 can be implemented to include the switches S5 and S6 and a circuit for controlling switching in an open loop, such as including the comparator U9, the signal generator U10, the flip-flop U11 and the inverter U12. The inductor L3 and the capacitor C3 can be external to the integrated circuit 100. The resistors R5 and R6 are preferably formed as part of the integrated circuit 100, but could be discrete components external to the integrated circuit or could be a potentiometer. Accordingly, the integrated circuit 100 operating as a voltage regulator requires only three pins; a first pin for the supply node Vs3, a second pin for the ground node GND and a third pin for the node VL1. A fourth pin can be added for the input signal VIN1, such that the integrated circuit operating as power amplifier requires only four pins.

In certain applications, it may be desirable for the output voltage Vo3 of the buck converter to vary with the input voltage Vs3. In such case, a ramp signal having a linear slope over each period can be applied directly to the inverting input of the comparator U9 (FIG. 5), rather than the signal V/T. Therefore, the signal applied to the inverting input of the comparator U9 can have a positive slope over each period, as does the signal VLIN1, or the signal can have a negative slope over each period (VLIN2). Because the signal applied to the inverting input of the comparator U9 has a linear slope, rather than a slope of 1/time vs. time, the output voltage Vo will respond to changes in the input voltage Vs3.

Figure 13:
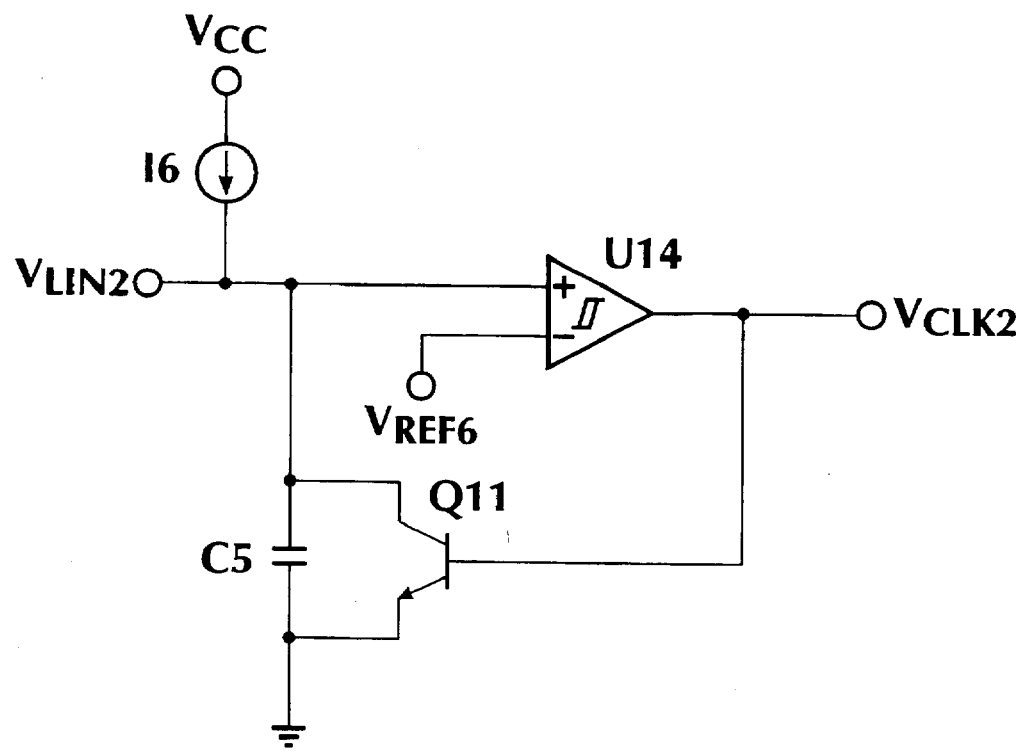
FIG. 13 illustrates a schematic diagram of a circuit for forming a periodic linear ramp signal having a maximum amplitude related to an input voltage and having a relatively fixed frequency.

FIG. 13 illustrates a schematic diagram of a generator circuit for generating a periodic ramp signal VLIN2 having a positive linear slope and for generating a clock signal VCLK2. A reference voltage node VCC is coupled to a first terminal of a current source I6. A second terminal of the current source I6 is coupled to a first terminal of a capacitor C5, to a collector of an npn bipolar transistor Q11 and to a non-inverting input of an hysteretic comparator U14, forming a node VLIN2. A second terminal of the capacitor C5 and an emitter of the transistor Q11 are coupled to the ground node. A base of the transistor Q11 is coupled to an output of the comparator U14, forming a node VCLK2. A reference voltage level VREF6 is coupled to an inverting input of the comparator U14.

The level of voltage at the node VREF6 is higher than the ground level and represents a maximum amplitude for the signal formed at the node VLIN2. When the output of the comparator U14 is a logical high voltage, the transistor Q11 is turned on, bringing the voltage level at the node VLIN2 to near the ground level. This causes the output of the comparator U14 to fall to a logical low voltage. Because the comparator U14 is hysteretic, its output does not fall until the capacitor C5 has discharged. Then, the current source I6 begins charging the capacitor C5 with a current, causing the voltage at the node VLIN2 to rise such that it has a positive slope that is substantially linear. When the voltage at the node VLIN2 rises above the reference voltage VREF6, the output of the comparator U14 rises to a logical high voltage, turning the transistor Q11 on again, and the cycle repeats.

Figure 14:
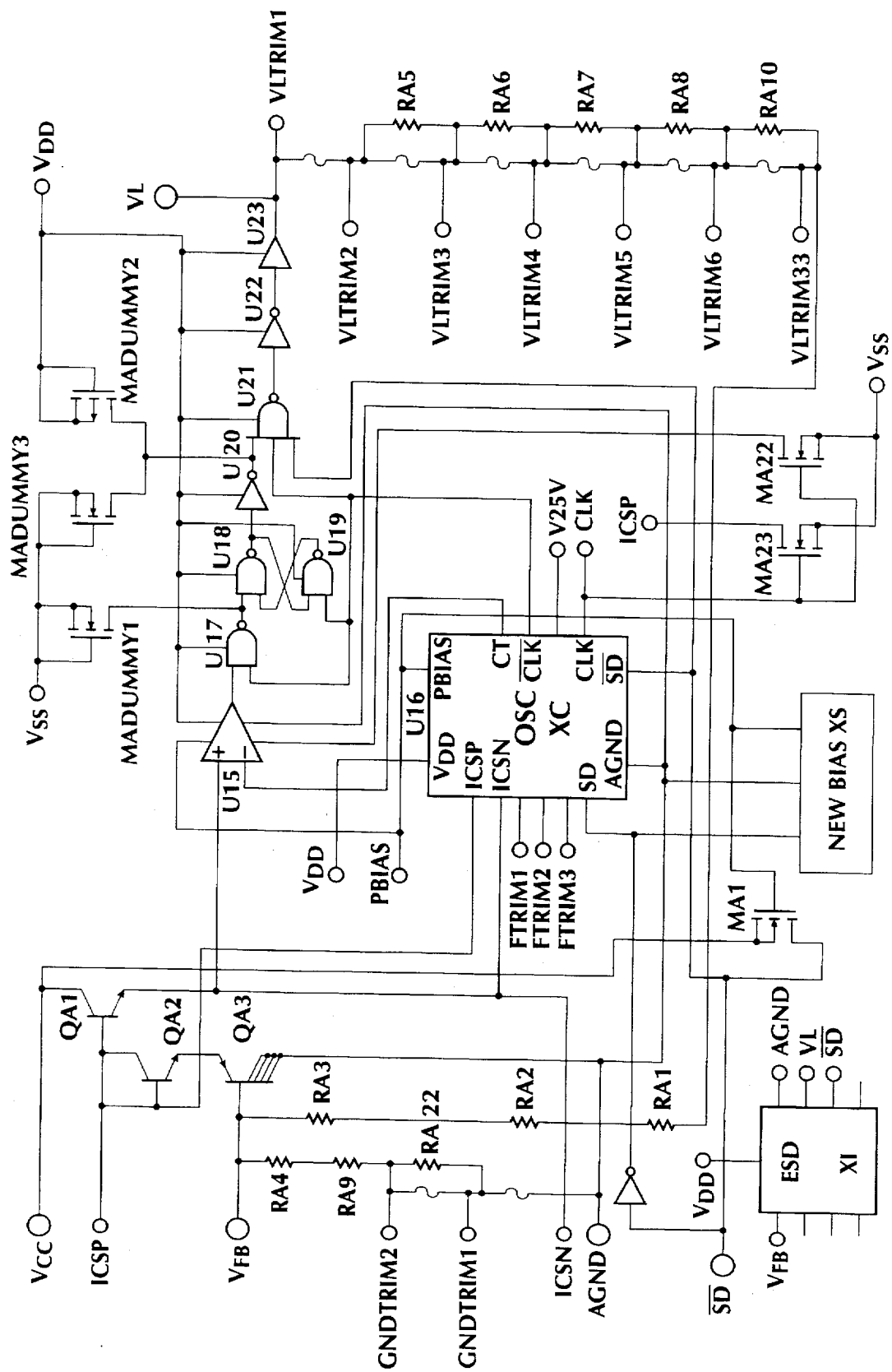
FIG. 14 illustrates a bus termination circuit including a buck converter.

Because the buck converter can sink current in addition to sourcing current while maintaining a regulated output voltage, the buck converter can function as a bus terminator. FIG. 14 illustrates a bus termination circuit including a buck converter according to the present invention. A voltage at the node VL is reduced by resistive divider including the resistors RA1–RA10. A level shift circuit including the transistors QA1–QA3 raises the signal formed by the resistive divider. The raised signal is applied to a non-inverting input of a comparator U15. An oscillator U16 generates a linear periodic ramp signal which is applied to an inverting input of the comparator U15. An output of the comparator U15 controls the state of a driver circuit U23 through logic circuits U17–U22. The driver circuit U23 performs the functions of the switches S5 and S6 (FIG. 5) by appropriately coupling the node VL to the supply voltage VDD or to ground.

The periodic ramp signal generated by the oscillator U16 preferably has a maximum amplitude that is approximately one-half of the rail-to-rail voltage. Therefore, the maximum amplitude is approximately 2.5 volts (VDD–0.0 volts/2; where VDD is 5.0 volts). The periodic ramp signal is preferably centered about 2.5 volts. Therefore, to achieve a duty cycle for the driver U23 that is nominally 50%, the resistive divider reduces the voltage at the node VL to approximately one-fourth of its value and the level shift circuit raises the level of the signal formed by the resistive divider by one diode drop. Preferably, provision is made for trimming the resistive divider with fusible links.

Figure 15:
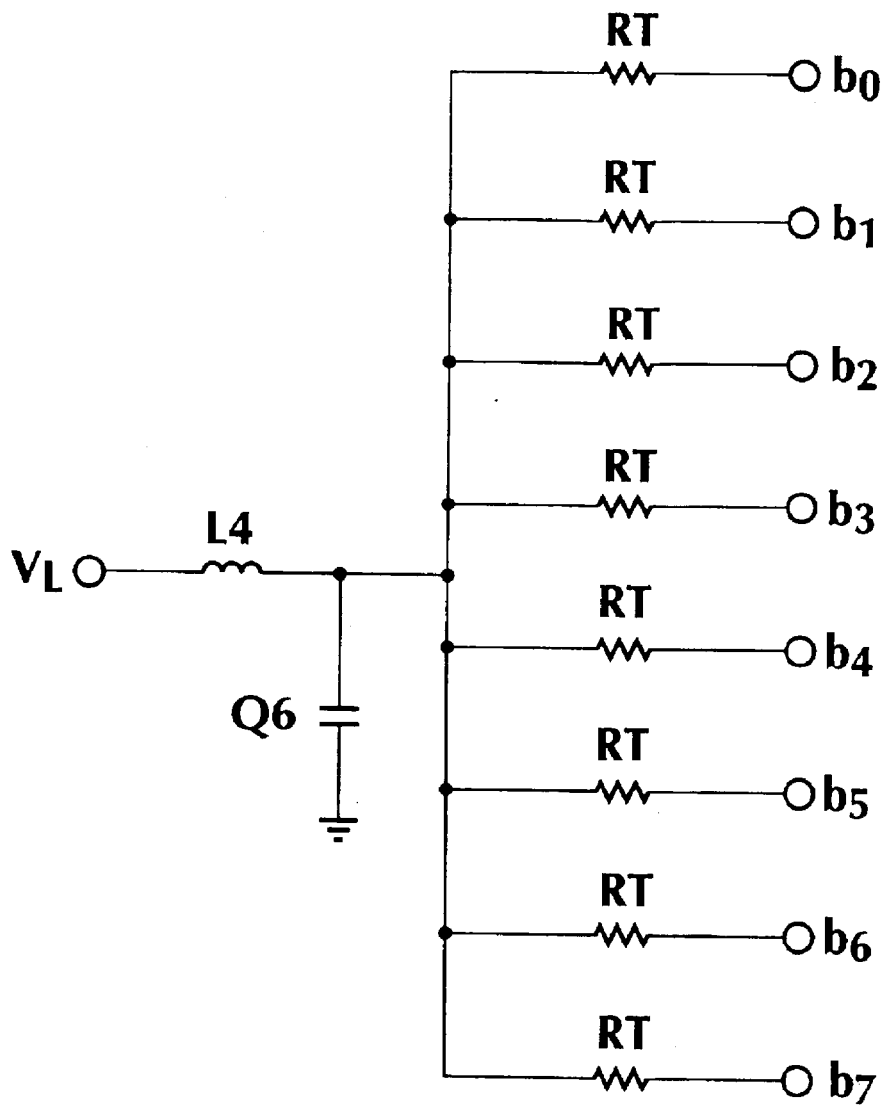
FIG. 15 illustrates elements of the bus termination circuit external to the circuit illustrated in FIG. 14.

Because the bus termination circuit illustrated in FIG. 14 is preferably implemented as an integrated circuit, external elements are required. FIG. 15 illustrates elements of the bus termination circuit external to the circuit illustrated in FIG. 14. A first terminal of an inductor L4 is coupled to the node VL. A second terminal of the inductor L4 is coupled to a first terminal of a capacitor C6 and to a first terminal of each of a plurality of termination resistors $R_T$. A second terminal of the capacitor C6 is coupled to the ground node. A second terminal of each termination resistor $R_T$ is coupled to one of the bit-lines $b_0$–$b_7$ of the bus.

Because the duty cycle for the driver U23 is approximately 50% and the supply voltage VDD is preferably 5.0 volts, the output voltage is approximately 2.5 volts.

Preferably, the bus terminator circuit can sink and source up to 600 mA of current. The number and value of termination resistors $R_T$ are selected to be compatible with a particular bus. For example, FIG. 15 illustrates an 8 bit bus. Other bus configurations can be accommodated by adding or subtracting from the number of termination resistors $R_T$. In addition, the bus resistors can be 50 ohms, 70 ohms, 300 ohms or some other appropriate value depending upon the particular bus.

In other applications, it may be desirable for the output voltage Vo3 of the buck regulator to vary based upon an input signal other than the input voltage, Vs3. This can be accomplished by applying a periodic signal VLIN1 or VLIN2 having a linear slope to the inverting input of the comparator U9 illustrated in FIG. 5, while the input voltage Vs3, is replaced with a regulated input voltage VCC (e.g. the level of VCC is regulated by another power converter stage). Because the input voltage VCC does not change, the signal applied to the inverting input of the comparator U9 need not vary with 1/time vs. time. Then, a variable signal can be superimposed upon the signal formed by the resistive divider.

Figure 16:
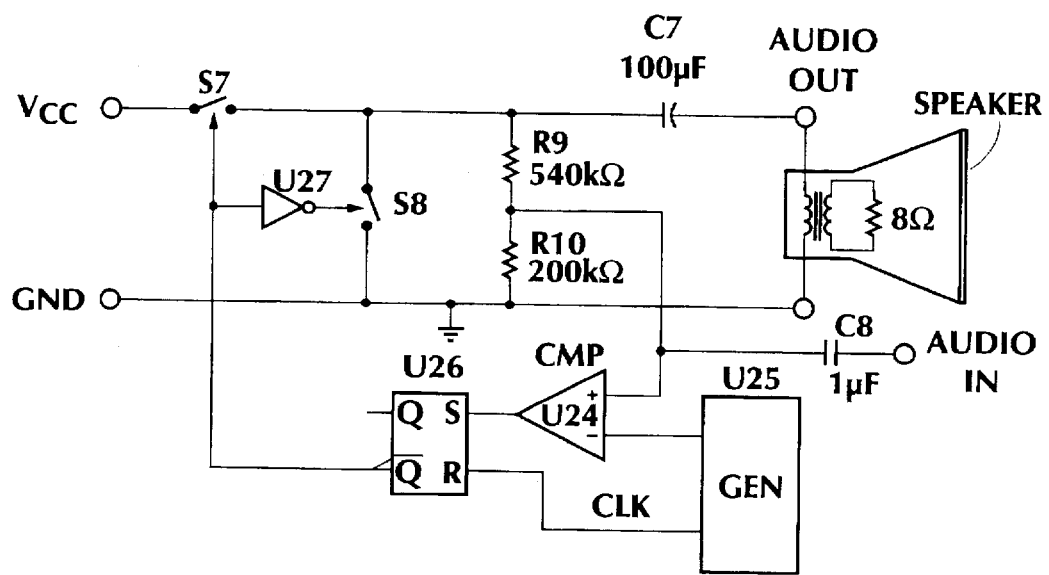
FIG. 16 illustrates a schematic diagram of an audio amplifier circuit including a buck converter.

As an example of such a circuit, FIG. 16 illustrates a schematic diagram of an audio amplifier. A supply voltage VCC is coupled to a first terminal of a switch S7. A second terminal of the switch S7 is coupled to a first terminal of a switch S8, to a first terminal of a resistor R9 and to a first terminal of a capacitor C7. A second terminal of the capacitor C7 is coupled to a first terminal of a speaker, forming an output node AUDIO OUT. A second terminal of the switch S8 and a second terminal of the speaker are coupled to a ground node.

A second terminal of the resistor R9 is coupled to a first terminal of a resistor R10, to a first terminal of a capacitor C8 and to a non-inverting input of a comparator U24. A second terminal of the capacitor C8 is coupled to a node AUDIO IN. A second terminal of the resistor R10 is coupled to the ground node. A signal generator U25 is coupled to provide a periodic ramp signal to an inverting input of the comparator U24. An output of the comparator U24 is coupled to a set input S of a flip-flop U26. A clock signal generated by the signal generator U25 is coupled to a reset input R of the flip-flop U26. A $\overline{Q}$ output of the flip-flop U26 is coupled to control the switch S7 and to an input of an inverter U27. An output of the inverter U27 is coupled to control the switch S8.

In practice, the audio amplifier illustrated in FIG. 16 has a bandwidth that approaches the switching frequency. Because the switching frequency is preferably approximately 29 kHz, the bandwidth is nearly 29 kHz. In addition, the audio amplifier exhibits low distortion, which is on the order of approximately 1%.

Varying the output voltage Vo3 based upon changes in a signal other than the input signal Vs3, can also be accomplished by varying the level of the reference voltage VREF3 applied to the circuit illustrated in FIG. 10, thereby increasing the amplitude of the signal VLIN1. When the level of the reference voltage VREF3 is adjusted, however, this will affect the switching frequency of the switch S5. This is because the capacitor C4 is discharged at a constant rate. Therefore, if the capacitor C4 is charged to a higher level, more time will be taken for the capacitor C4 to be discharged to the level of the reference voltage VREF4. Therefore, each period of the signal generated at the node VLIN will be extended.

Figure 17:
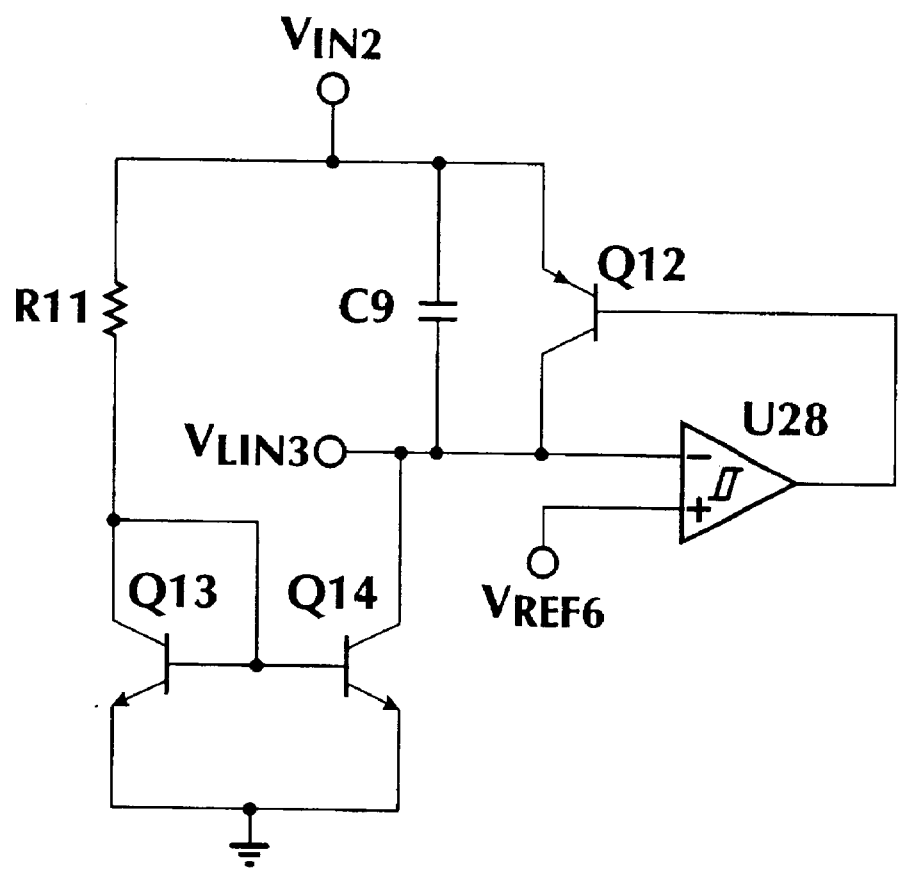
FIG. 17 illustrates a schematic diagram of a circuit for forming a periodic linear ramp signal having a maximum amplitude related to an input voltage and having a relatively fixed frequency.

FIG. 17 illustrates a schematic diagram of a circuit for forming a periodic linear ramp signal VLIN3 having a maximum amplitude related to an input voltage VIN2 and having a relatively fixed frequency. A node VIN2 is coupled to a first terminal of a resistor R11, to a first terminal of a capacitor C9 and to an emitter of a pnp bipolar transistor Q12. A second terminal of the resistor R11 is coupled to a collector of an npn bipolar transistor Q13, to a base of the transistor Q13 and to a base of an npn bipolar transistor Q14. An emitter of the transistor Q13 and an emitter of the transistor Q14 are coupled to the ground node. A collector of the transistor Q14 is coupled to a second terminal of the capacitor C9, to a collector of the transistor Q12 and to an inverting input of a hysteretic comparator U28, forming a node VLIN3. A non-inverting input of the comparator U28 is coupled to receive a reference voltage VREF6. An output of the comparator U28 is coupled to a base of the comparator U28.

The circuit illustrated in FIG. 17 functions similarly to the circuit illustrated in FIG. 10 except that the circuit illustrated in FIG. 17 includes a current mirror comprising the transistors Q13 and Q14. When a voltage source having a variable voltage is coupled to the node VIN2, a level current through the resistor R11 and the transistor Q13 is representative of the level of voltage at the node VIN2. This current is mirrored through the transistor Q14.

When the output of the comparator U28 is a logical low voltage, the transistor Q12 is turned on, bringing the voltage level at the node VLIN3 to near the voltage level of VIN2. This causes the output of the comparator U28 to rise to a logical high voltage. Because the comparator U28 is hysteretic, its output does not rise until the charge on the capacitor C9 has substantially equalized. Then, the current mirror begins drawing current from the capacitor C9, causing the voltage at the node VLIN3 to fall such that it has a negative slope that is substantially linear. The slope, however, becomes increasingly steep as the value of VIN2 increases. When the voltage at the node VLIN1 falls below the reference voltage VREF6, the output of the comparator U28 falls to a logical low voltage, turning the transistor Q12 on again, and the cycle repeats. The value of the resistor R11 and capacitor C9 are preferably chosen such that the time taken for the current mirror to discharge the capacitor C9 is approximately the same despite variations in the voltage level at the node VIN2. This results in a periodic linear ramp signal at the node VLIN3 having an amplitude that is dependent upon the voltage level at the node VIN2, but having a relatively fixed frequency.

A similar result can be achieved by varying the level of the reference voltage VREF6 applied to the circuit illustrated in FIG. 13 and replacing the current source I6 with a current mirror comprising a pair of pnp transistors wherein a level of current in the current mirror is related to the level of the voltage VREF6.

Figure 18:
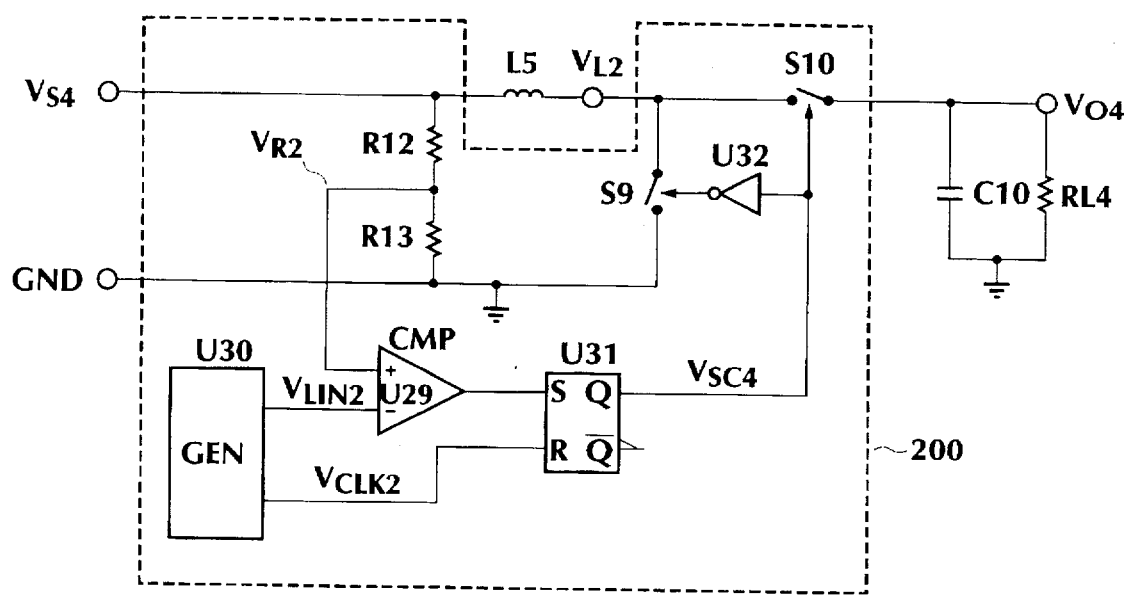
FIG. 18 illustrates a boost converter having its output voltage regulated according to the present invention.

FIG. 18 illustrates a boost converter having its output voltage regulated according to the present invention. A supply node Vs4 is coupled to a first terminal of an inductor L5 and to a first terminal of a resistor R12. A second terminal of the inductor L5 is coupled to a first terminal of a switch S9 and to a first terminal of a switch S10, forming a node VL2. A second terminal of the switch S10 is coupled to a first terminal of a capacitor C10, forming an output node Vo4. A second terminal of the switch S9 and a second terminal of the capacitor C10 are coupled to a ground node. A load RL4 can be coupled across the capacitor C10.

A second terminal of the resistor R12 is coupled to a first terminal of a resistor R13 and to a non-inverting input of a comparator U29 forming a node VR2. A second terminal of the resistor R13 is coupled to the ground node. A signal generator U30 is coupled to provide a periodic ramp signal to an inverting input of the comparator U29. An output of the comparator U29 is coupled to a set input S of a flip-flop U31. A clock signal generated by the signal generator U30 is coupled to a reset input R of the flip-flop U31. A $\overline{Q}$ output of the flip-flop U31 forms a signal VSC4 and is coupled to control the switch S10. The signal VSC4 is inverted by an inverter U32 for controlling the switch S9.

The boost converter illustrated in FIG. 18 always operates in continuous conduction mode. This means that a current in the inductor L4 flowing towards the output node Vo4 can be above zero or can fall below zero (e.g., this current is not clamped to zero by a diode in place of the switch S10). A duty cycle DT2 of the switch S10 is the portion of each switching cycle that the switch S10 is closed. Therefore, the output voltage of the boost converter is equal to the duty cycle DT2 for the switch S10 divided by the input voltage: Vo4=Vs4/DT2, assuming the switch S10 has zero on-resistance. Therefore, the duty cycle DT2 is equal to the input voltage divided by the output voltage: Vs4/Vo4=DT2. Assuming a constant output voltage is desired, the duty cycle DT2 is proportional to the input voltage: Vs4 DT2.

Accordingly, the signal generator U30 generates a linear periodic ramp signal VLIN2 having a maximum amplitude that does not vary with the input voltage and a predetermined frequency. By comparing this periodic signal VLIN2 to a voltage level that is representative of the input voltage Vs4 for each switching cycle, an appropriate duty cycle DT2 can be achieved for maintaining a constant output voltage Vo4 without the need for monitoring the output voltage in a feedback loop.

Figure 19:
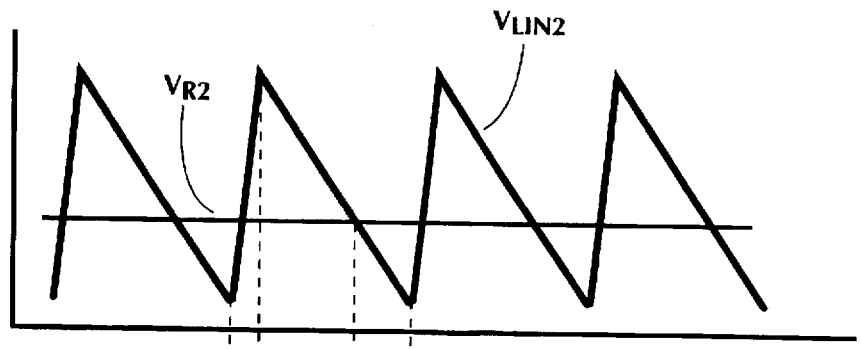
FIG. 19 illustrates a timing diagram of a signal VLIN2 generated by the generator circuit illustrated in FIG. 16.
Figure 20:
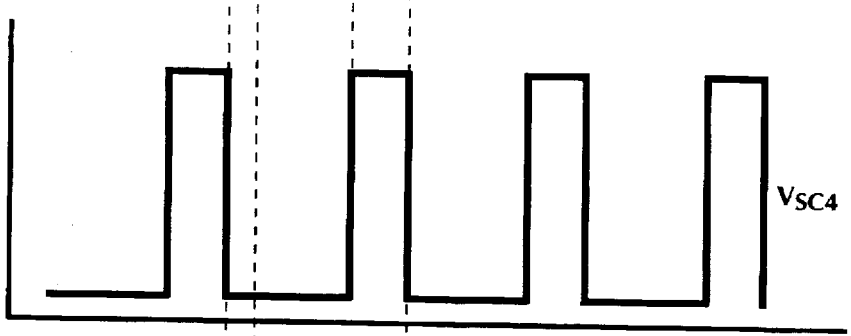
FIG. 20 illustrates a timing diagram of a switch control signal VSC4 for the circuit illustrated in FIG. 17.
Figure 21:
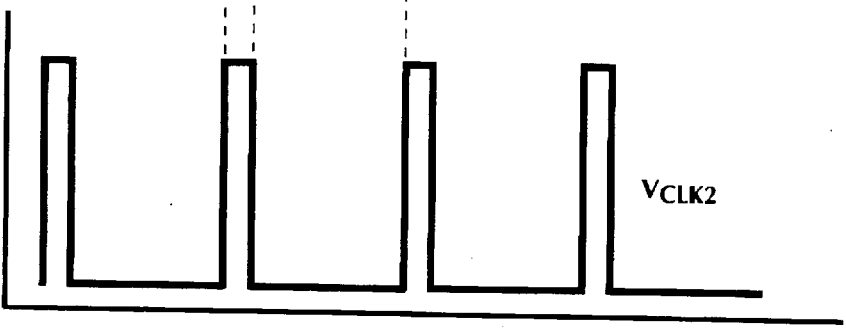
FIG. 21 illustrates a timing diagram of the clock signal VCLK2 generated by the generator circuit illustrated in FIG. 16.
Figure 15:
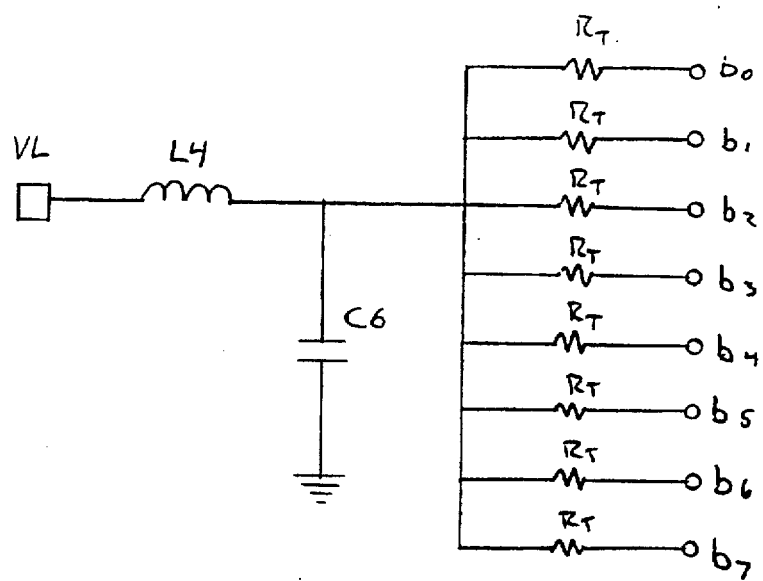

FIG. 19 illustrates a timing diagram of a signal VLIN2 generated by the generator circuit U25 illustrated in FIG. 18. The signal VLIN2 is periodic and has an amplitude that decreases linearly over each period. As explained above, such a waveform is suitable for comparison with a signal representative of the input voltage Vs4 for controlling the duty cycle DT2 of the switch S9 for maintaining a constant output voltage Vo4. FIG. 19 also illustrates a timing diagram of the signal VR2 formed by the resistive divider illustrated in FIG. 18. The signal VR2 is representative of the input voltage Vs4. The signal VR2 will be reduced, however, an amount determined by the values of the resistors R12 and R13. FIG. 20 illustrates a timing diagram of a switch control signal VSC4 for the circuit illustrated in FIG. 18. FIG. 21 illustrates a timing diagram of the clock signal VCLK2 generated by the generator circuit U25 illustrated in FIG. 18.

Referring to FIGS. 18–21, when the Q output of the flip-flop U30 is at a logical low voltage, the switch S9 is closed and switch S10 is open. The signal VLIN2 begins falling, but while it is higher than the signal VR2, the output of the comparator U29 is a logical low voltage, maintaining the Q output at a logical low voltage. When the signal VLIN2 falls below the level of the signal VR2, the output of the comparator U29 becomes a logical high voltage. This sets the Q output of the flip-flop U31 to a logical high voltage, opening the switch S9 and closing the switch S10. The Q output of the flip-flop U31 remains at a logical low voltage until the clock signal VCLK2 resets the Q output to a logical low voltage, and the cycle repeats. The shape of the waveform VLIN2 is appropriate for determining an appropriate switching time despite variations in the level of the signal VR2. Therefore, the output voltage is regulated without a feedback path coupled to the output node Vo4.

The level of the regulated output voltage can be adjusted by adjusting the level of the signal VR2. This can be accomplished by selecting appropriate values for the resistors R12 and R13. It will be apparent that the flip-flop U31 could be eliminated. In such case, the output of the comparator U29 could be coupled to control the switch S10 directly and inverted to control the switch S9. It will also be apparent that the signal VLIN2 could have a linearly increasing slope, such as the signal VLIN1 with appropriate circuit modifications.

The voltage VR2, which is representative of the input voltage at the node Vs4, rather than the output voltage at the node Vo4, is monitored for regulating the output voltage Vo4. As illustrated by the dotted line in FIG. 18, an integrated circuit 200 can be implemented to include the switches S9 and S10 and a circuit for controlling switching in an open loop, such as including the comparator U29, the signal generator U30, the flip-flop U31 and the inverter U32. The inductor L5 and the capacitor C10 can be external to the integrated circuit. The resistors R12 and R13 are preferably formed as part of the integrated circuit 200, but could be discrete components external to the integrated circuit 200 or could be a potentiometer. Accordingly, the integrated circuit requires only four pins; a first pin for the supply node Vs4, a second pin for the ground node GND; a third pin for the node VL2 and a fourth pin for the output node Vo4.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiments chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components and voltage levels disclosed herein. In addition, it will be apparent that a transistor of one type, such as NMOS, PMOS, bipolar pnp or bipolar npn can be interchanged with a transistor of another type, and in some cases interchanged with a diode, with appropriate modifications of the remaining circuitry, and so forth.

What is claimed is:

1. A switching mode power converter including an integrated circuit controller, wherein none of the pins of the integrated circuit controller are coupled to monitor a regulated output of the power converter, the integrated circuit controller comprising:

a. a first pin coupled to a first terminal of a first switch;
b. a second pin coupled to a second terminal of the first switch and to a first terminal of a second switch;
c. a third pin coupled to a second terminal of the second switch; and
d. a circuit coupled to control the first switch and the second switch by comparing a signal proportional to a voltage formed at the second terminal of the first switch to a periodic signal;

wherein the switching mode power converter further comprises:

a. a first energy storage device having a first terminal and a second terminal, wherein the first terminal of the first energy storage device is coupled to the second pin and wherein the regulated output is formed at the second terminal of the first energy storage device; and
b. a second energy storage device having a first terminal and a second terminal, wherein the first terminal of the second energy storage device is coupled to the second terminal of the first energy storage device and wherein the second terminal of the second energy storage device is coupled to the third pin.

2. The switching mode power converter according to claim 1 wherein the periodic signal is representative of 1/time vs. time over each period.

3. A switching mode power converter for providing an output voltage at an output node from an input voltage source, the power converter comprising:

a. a first switch for storing energy from the input source in an energy storage device;
b. a second switch for discharging the energy storage device, the second switch coupled to the first switch; and
c. a control circuit for controlling switching of the first switch and the second switch in an open loop based upon a level of the input voltage source wherein the control circuit compares a signal representative of the level of the input voltage source to a periodic waveform for controlling said switching.

4. The switching mode power converter according to claim 3 wherein the control circuit comprises:

a. a comparator having a first input terminal, a second input terminal and an output terminal wherein the first input terminal of the comparator is coupled to receive the signal representative of the level of the input voltage source;
b. a generator for generating the periodic waveform at a first output terminal and a clock signal at a second output terminal wherein the first output terminal of the generator is coupled to the second input terminal of the comparator; and
c. a flip-flop having a first input, a second input and an output terminal, wherein the first input of the flip-flop is coupled to the output terminal of the comparator, the second input of the flip-flop is coupled to the second output terminal of the generator and the output terminal of the flip-flop is coupled to control said switching.

5. The switching mode power converter according to claim 4 wherein an input node for a variable signal is also coupled to the first input terminal of the comparator and wherein the output voltage is representative of the variable signal.

6. The switching mode power converter according to claim 4 wherein the generator comprises:

a. a capacitor wherein the periodic waveform is a voltage across the capacitor changing over time;
b. a current source coupled to the capacitor; and
c. a circuit for setting the voltage across the capacitor to a first level when the voltage reaches a second level wherein a maximum amplitude of the periodic waveform is a difference between the first level and the second level.

7. The switching mode power converter according to claim 6 wherein the maximum amplitude of the periodic waveform is representative of the input voltage and further wherein the current source provides a current that is representative of the maximum amplitude thereby the periodic waveform has a frequency that is substantially fixed despite changes in the input voltage.

8. The switching mode power converter according to claim 3 wherein the control circuit does not utilize a feedback loop for sensing the output voltage.

9. The switching mode power converter according to claim 3 wherein the energy storage device is an inductor.

10. The switching mode power converter according to claim 3 wherein the energy storage device is a capacitor.

11. The switching mode power converter according to claim 3 wherein a variable signal is added to the signal representative of the level of voltage at the first terminal of the energy storage device and wherein the output voltage is representative of the variable signal.

12. The switching mode power converter according to claim 11 wherein the input voltage is regulated.

13. The switching mode power converter according to claim 3 wherein the periodic waveform is representative of 1/time vs. time over each period.

14. The switching mode power converter according to claim 3 wherein an amplitude of the periodic waveform is representative of a variable signal and wherein the output voltage is representative of the variable signal.

15. The switching mode power converter according to claim 3 wherein the periodic waveform is linear over each period.

16. The switching mode power converter according to claim 15 wherein a maximum amplitude of the periodic waveform is representative of the input voltage.

17. The switching mode power converter according to claim 16 wherein a frequency of the periodic waveform remains substantially fixed despite variations in the input voltage.

18. A switching mode power converter for providing an output voltage at an output node from an input voltage source, the power converter comprising:

a. a first switch having a first terminal, a second terminal and a control terminal, wherein the first terminal is coupled to the input voltage source;

b. an energy storage device having a first terminal and a second terminal wherein a first terminal of the energy storage device is coupled to the second terminal of the first switch and the second terminal of the energy storage device is coupled to the output node;

c. a second switch having a first terminal, a second terminal and control terminal, wherein the first terminal of the second switch is coupled to the first terminal of the energy storage device and the second terminal is coupled to a ground node;

d. a control circuit for controlling switching of the first switch and the second switch by monitoring a level of voltage at the first terminal of the energy storage device, the control circuit coupled to the control terminal of the first switch, to the control terminal of the second switch and coupled to the first terminal of the energy storage device, wherein the control circuit comprises:

i. a comparator having a first input terminal, a second input terminal and an output terminal wherein the first input terminal of the comparator is coupled to the first terminal of the energy storage device;

ii. a generator for generating a periodic waveform at a first output terminal and a clock signal a second output terminal wherein the first output terminal of the generator is coupled to the second input terminal of the comparator; and iii. a flip-flop having a first input, a second input and an output terminal wherein the first input of the flip-flop is coupled to the output terminal of the comparator, the second input of the flip-flop is coupled to the second output terminal of the generator and the output terminal of the flip-flop is coupled to control switching.

19. The switching mode power converter according to claim 18 wherein an input node for a variable signal is also coupled to the first input terminal of the comparator and wherein the output voltage is representative of the variable signal.

20. The switching mode power converter according to claim 18 wherein the generator comprises:

a. a capacitor wherein the periodic waveform is a voltage across the capacitor changing over time;

b. a current source coupled to the capacitor; and c. a circuit for setting the voltage across the capacitor to a first level when the voltage reaches a second level wherein a maximum amplitude of the periodic waveform is a difference between the first level and the second level.

21. The switching mode power converter according to claim 20 wherein the maximum amplitude of the periodic waveform is representative of the input voltage and further wherein the current source provides a current that is representative of the maximum amplitude thereby the periodic waveform has a frequency that is substantially fixed despite changes in the input voltage.

22. A switching mode power converter for providing an output voltage at an output node from an input voltage source, the power converter comprising:

a. a first switch having a first terminal, a second terminal and a control terminal, wherein the first terminal is coupled to the input voltage source;

b. an energy storage device having a first terminal and a second terminal wherein a first terminal of the energy storage device is coupled to the second terminal of the first switch and the second terminal of the energy storage device is coupled to the output node;

c. a second switch having a first terminal, a second terminal and control terminal, wherein the first terminal of the second switch is coupled to the first terminal of the energy storage device and the second terminal is coupled to a ground node;

d. a control circuit for controlling switching of the first switch and the second switch by monitoring a level of voltage at the first terminal of the energy storage device, the control circuit coupled to the control terminal of the first switch, to the control terminal of the second switch and coupled to the first terminal of the energy storage device, wherein the control circuit compares a signal representative of the level of voltage at the first terminal of the energy storage device to a periodic waveform for controlling switching.

23. The switching mode power converter according to claim 22 wherein the energy storage device is an inductor.

24. The switching mode power converter according to claim 22 wherein the energy storage device is a capacitor.

25. The switching mode power converter according to claim 22 wherein a variable signal is added to the signal representative of the level of voltage at the first terminal of the energy storage device and wherein the output voltage is representative of the variable signal.

26. The switching mode power converter according to claim 25 wherein the input voltage is regulated.

27. The switching mode power converter according to claim 22 wherein the periodic waveform is representative of 1/time vs. time over each period.

28. The switching mode power converter according to claim 22 wherein an amplitude of the periodic waveform is representative of a variable signal and wherein the output voltage is representative of the variable signal.

29. The switching mode power converter according to claim 22 wherein the periodic waveform is linear over each period.

30. The switching mode power converter according to claim 29 wherein a maximum amplitude of the periodic waveform is representative of the input voltage.

31. The switching mode power converter according to claim 30 wherein a frequency of the periodic waveform remains substantially fixed despite variations in the input voltage.

32. A switching mode power converter including an integrated circuit controller, the integrated circuit controller comprising:
 a. a first pin coupled to a first terminal of a first switch;
 b. a second pin coupled to a second terminal of the first switch and to a first terminal of a second switch;
 c. a third pin coupled to a second terminal of the second switch; and
 d. a circuit coupled to control the first switch and the second switch by comparing a signal proportional to a voltage formed at the second terminal of the first switch to a periodic signal wherein the voltage formed at the second terminal of the first switch is representative of an input voltage applied to the first pin when the first switch is closed.

33. The switching mode power converter according to claim 32 wherein the periodic signal is representative of 1/time vs. time over each period.

34. The switching mode power converter according to claim 32 further comprising:
 a. a first energy storage device having a first terminal and a second terminal, wherein the first terminal of the first energy storage device is coupled to the second pin and wherein the regulated output is formed at the second terminal of the first energy storage device; and
 b. a second energy storage device having a first terminal and a second terminal, wherein the first terminal of the second energy storage device is coupled to the second terminal of the first energy storage device and wherein the second terminal of the second energy storage device is coupled to the third pin.

35. The switching mode power converter according to claim 34 wherein none of the pins of the integrated circuit controller are coupled to monitor a regulated output of the power converter.

36. A switching mode power converter including an integrated circuit controller, the integrated circuit controller comprising:
 a. a first pin coupled to a first terminal of a first switch;
 b. a second pin coupled to a second terminal of the first switch and to a first terminal of a second switch;
 c. a third pin coupled to a second terminal of the second switch; and
 d. a circuit coupled to control the first switch and the second switch by comparing a signal proportional to a voltage formed at the second terminal of the first switch to a periodic signal wherein the periodic signal is representative of 1/time vs. time over each period.

37. The switching mode power converter according to claim 36 wherein none of the pins of the integrated circuit controller are coupled to monitor a regulated output of the power converter.

38. A switching mode power converter for providing an output voltage at an output node from an input voltage source, the power converter comprising:
 a. a first switch for storing energy from the input source in an energy storage device;
 b. a second switch for discharging the energy storage device, the second switch coupled to the first switch; and
 c. a control circuit for controlling switching of the first switch and the second switch in an open loop based upon a level of the input voltage source wherein the output voltage is controlled without being sensed by the control circuit.

39. The switching mode power converter according to claim 38 wherein the energy storage device is an inductor.

40. The switching mode power converter according to claim 38 wherein the energy storage device is a capacitor.

41. The switching mode power converter according to claim 38 wherein a variable signal is added to a signal representative of the level of the input voltage source and wherein the output voltage is representative of the variable signal.

* * * * *

UNITED STATES PATENT AND TRADEMARK OFFICE
CERTIFICATE OF CORRECTION

PATENT NO. : 5,894,243
DATED : April 13, 1999
INVENTOR(S) : Jeffrey H. Hwang

It is certified that error appears in the above-indentified patent and that said Letters Patent is hereby corrected as shown below:

In the Drawing, Sheet 11 of 15, delete Figure 15, and substitute Fig. 15, as shown on the attached page.

In Col. 5, line 61, delete "1/Vs3 DT." before "FIG. 6" and insert --$1/Vs3 \propto DT$.--
In Col. 12, line 23, delete "Vs4 DT2." after "voltage:" and insert --$Vs4 \propto DT2$.--

Signed and Sealed this

Twenty-third Day of November, 1999

Attest:

Q. TODD DICKINSON

*Attesting Officer*          *Acting Commissioner of Patents and Trademarks*